J. V. VROOMAN.

Stove Covers.

No. 6,108. Reissued Oct. 27, 1874.

Witnesses:

Jonas H. Clute.
Thomas Houghton.

Inventor

Jacob V Vrooman

THE GRAPHIC CO. PHOTO-LITH. 39 & 41 PARK PLACE, N.Y.

UNITED STATES PATENT OFFICE.

JACOB V. VROOMAN, OF SCHENECTADY, NEW YORK.

IMPROVEMENT IN STOVE-COVERS.

Specification forming part of Letters Patent No. 119,434, dated September 26, 1871; reissue No. 6,108, dated October 27, 1874; application filed October 6, 1874.

*To all whom it may concern:*

Be it known that I, JACOB V. VROOMAN, of Schenectady, in the county of Schenectady and State of New York, have heretofore invented certain new and useful Improvements in Stove-Covers, upon which Letters Patent of the United States were granted to me, bearing date September 26, 1871; and I do hereby declare that the following is a full, clear, and exact description of the nature, construction, and operation of the same, reference being hereby had to the accompanying drawings, which make a part of this my new corrected and amended specification; and I do now surrender the said Letters Patent, in order that the invention and improvements aforesaid may be herein more fully described and set forth; and by such amended and corrected specification and claims my rights therein shall be more fully and permanently protected, as by law provided.

The principal part of my invention relates to the construction and arrangement of an interior cover, with reference to an outer cover of a stove, in such a manner as that, by opening or closing the one, we will open or close the other.

Figure 1:
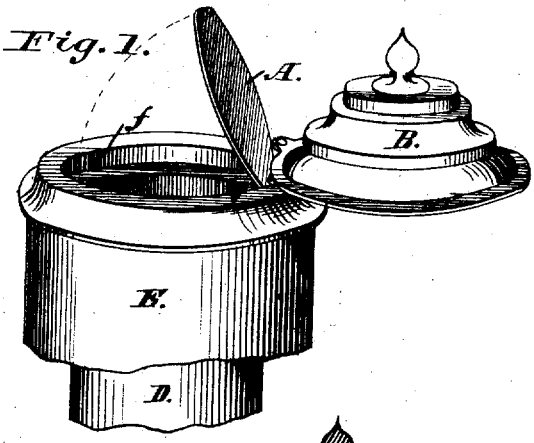
Figure 2:
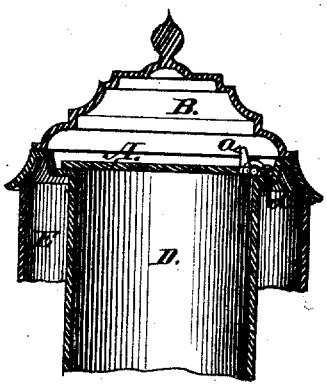
Figure 3:
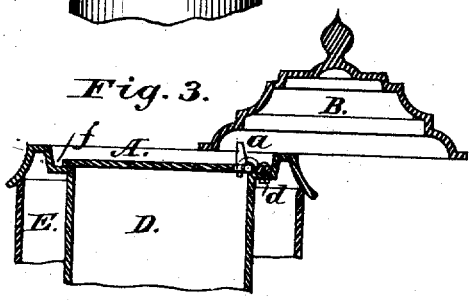
Figure 5:
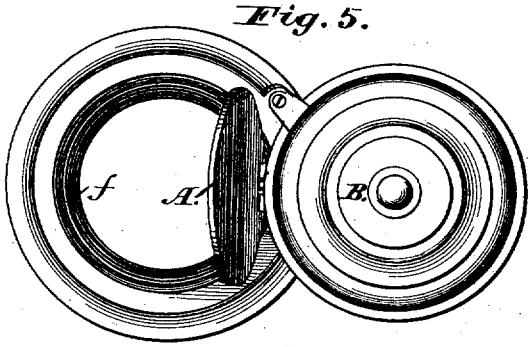
Figure 4:
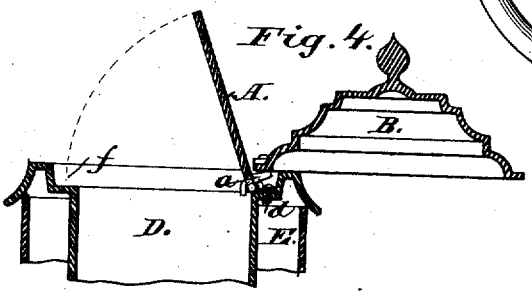
Figure 6:
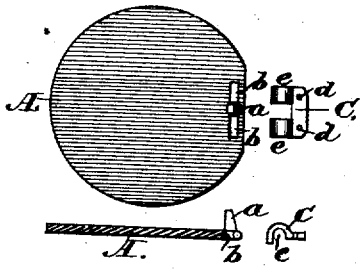

In the accompanying drawing, Figure 1 is a perspective view of a portion of the upper part of a stove embodying my invention. Fig. 2 is a central vertical section of the same on a plane running through the center of the hinge C of the lower or inner cover A. Fig. 3 is a vertical section, showing the outer cover B partially rotated, so as to uncover the lower cover A. Fig. 4 is a vertical section, showing the inner cover A as opened by rotating the outer cover or top B, a little more than shown in Fig. 3. Fig. 5 is a top view of Fig. 1. Fig. 6 is a view of cover A and its hinge C, as seen in plan and section.

A is the cover of the fuel-reservoir D of a stove. Said cover A is hinged fast to the bottom of a recess, *f*, in the top of the stove, as shown in the accompanying drawing. B is the outer cover or swing-top of the stove, upon which an urn is usually placed. Top or cover B has a horizontal motion around a bolt or rivet, *d*, in the usual manner. C is a hinge, made of one piece of metal, having one end, *e*, forked and slightly curved downward, so as to fit easily into two corresponding openings, *b b*, cast near the edge of a flat or straight side of cover A, as shown in Fig. 6. Hinge C may be fastened within recess *f*, at the top of the stove, by means of a bolt or rivet, *d*, as shown in Figs. 1 to 6 of the accompanying drawing. Upon the top of reservoir-cover A, and between its two hinge-openings, *b b*, is a cast nib or spur, *a*, projecting upward and about three-eighths or half an inch above the level of the bottom of the outer cover B, or sufficiently high for cover B to press against it when rotated outward or off the stove, so as to raise cover A to the position shown in Figs. 1, 4, and 5. D is the reservoir of the stove. E is the outer casing of the upper section of the stove.

In Fig. 2, we see the position of the two covers, A and B, when both are in their usual position.

In Figs. 1 and 4, we see the fuel-reservoir cover A opened, so as to permit a fresh supply of fuel to be put into the reservoir D.

It will be seen that hinge C and openings *b b* in cover A may be easily cast, and will require but little fitting, thus making a cheap and good mode of securing cover A to its place.

It will be seen from the above description that the operation of my invention will be as follows: To open cover A, we rotate or push cover B outward, as shown in Fig. 5, which causes the spur *a* to be gradually depressed by coming into contact with the under side of cover B, thus raising cover A in a manner similar to the raising of the long arm of a bent lever by pressure upon its shorter arm, as may be clearly seen upon reference to Fig. 4.

By the use of my invention, it will not be possible for any soot to get off the inner cover and fall upon the carpet or into the room—a very desirable feature in all parlor-stoves.

It will also be seen that a lifter will not be needed to remove the reservoir-cover.

I do not claim, broadly, the use of a hinged cover for fuel-reservoirs in stoves; but

What I claim as my invention is—

1. In a stove, provided with a movable exterior cover, the combination, with said cover, of an interior cover adapted to be opened simultaneously therewith, for purposes set forth.

2. The hinged cover A, having a spur or nib, *a*, combined and arranged with reference to cover B, operating in the manner and for the purpose herein shown.

J. V. VROOMAN.

Witnesses:

EDMUND L. COLE,

A. WILKINSON.